United States Patent
Kim et al.

(10) Patent No.: US 11,605,232 B2
(45) Date of Patent: Mar. 14, 2023

(54) SYSTEM AND METHOD FOR ROAD SIGN GROUND TRUTH CONSTRUCTION WITH A KNOWLEDGE GRAPH AND MACHINE LEARNING

(71) Applicant: Robert Bosch GmbH, Stuttgart (DE)

(72) Inventors: Ji Eun Kim, Pittsburgh, PA (US); Wan-Yi Lin, Pittsburgh, PA (US); Cory Henson, Pittsburgh, PA (US); Anh Tuan Tran, Heilbronn (DE); Kevin H. Huang, Pittsburgh, PA (US)

(73) Assignee: ROBERT BOSCH GMBH

( * ) Notice: Subject to any disclaimer, the term of this patent is extended or adjusted under 35 U.S.C. 154(b) by 379 days.

(21) Appl. No.: 17/004,133

(22) Filed: Aug. 27, 2020

(65) Prior Publication Data

US 2022/0067405 A1   Mar. 3, 2022

(51) Int. Cl.
  *G06V 20/58*   (2022.01)
  *G06N 20/00*   (2019.01)
  *G06K 9/62*   (2022.01)

(52) U.S. Cl.
  CPC ......... *G06V 20/582* (2022.01); *G06K 9/6263* (2013.01); *G06K 9/6267* (2013.01); *G06N 20/00* (2019.01)

(58) Field of Classification Search
  CPC .... G06V 20/582; G06N 20/00; G06K 9/6263; G06K 9/6267
  See application file for complete search history.

(56) References Cited

U.S. PATENT DOCUMENTS

| | | | |
|---|---|---|---|
| 9,092,695 B1* | 7/2015 | Ogale | G06V 10/751 |
| 9,459,626 B2 | 10/2016 | Chen et al. | |
| 2012/0046855 A1* | 2/2012 | Wey | G06V 20/582 701/117 |
| 2014/0193033 A1* | 7/2014 | Huth | G06V 20/582 382/103 |
| 2014/0294291 A1* | 10/2014 | Zhang | G06V 20/582 382/159 |
| 2016/0170414 A1* | 6/2016 | Chen | G06K 9/627 701/27 |
| 2017/0109612 A1* | 4/2017 | Mittal | G06V 20/56 |
| 2018/0120857 A1* | 5/2018 | Kappauf | G06V 20/582 |

(Continued)

FOREIGN PATENT DOCUMENTS

| CN | 110135301 A | 8/2019 |
|---|---|---|
| CN | 111178153 A | 5/2020 |

OTHER PUBLICATIONS

Kim et al., "Variational Prototyping-Encoder: One-Shot Learning with Prototypical Images", IEEE Xplore, 9 pages.

(Continued)

*Primary Examiner* — David Bilodeau
(74) *Attorney, Agent, or Firm* — Dickinson Wright PLLC

(57) ABSTRACT

A method of road sign classification utilizing a knowledge graph, including detecting and selecting a representation of a sign across a plurality of frames, outputting a prompt initiating a request for a classification associated with the representation of the sign, classifying one or more images including the sign, querying the knowledge graph to obtain a plurality of road sign classes with at least one same attribute as the sign, and classifying the sign across the plurality of frames in response to a confidence level exceeding a threshold.

20 Claims, 11 Drawing Sheets

(56) References Cited

U.S. PATENT DOCUMENTS

| | | | |
|---|---|---|---|
| 2019/0065871 A1* | 2/2019 | Pogorelik | G06V 20/582 |
| 2019/0272389 A1* | 9/2019 | Viente | G06V 20/582 |
| 2021/0172744 A1* | 6/2021 | Raut | G08G 1/09623 |

OTHER PUBLICATIONS

Ge et al., "Deep Metric Learning with Hierarchical Triplet Loss", ECCV 2018, China, 17 pages.

* cited by examiner

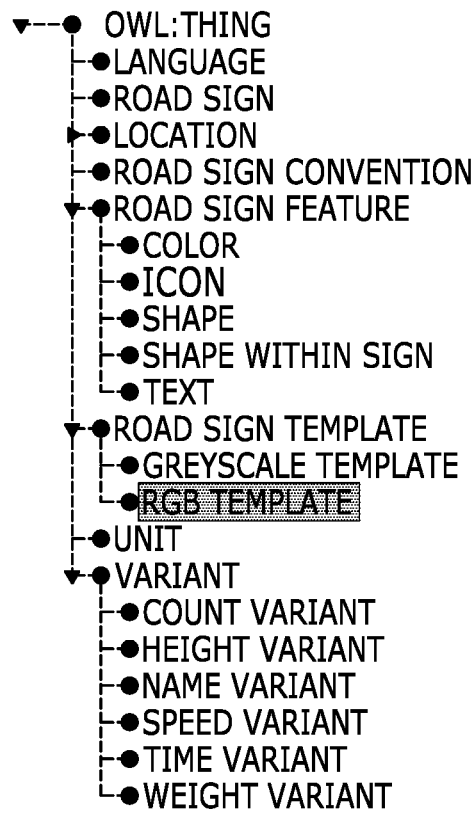
(A) CLASS HIERARCHY
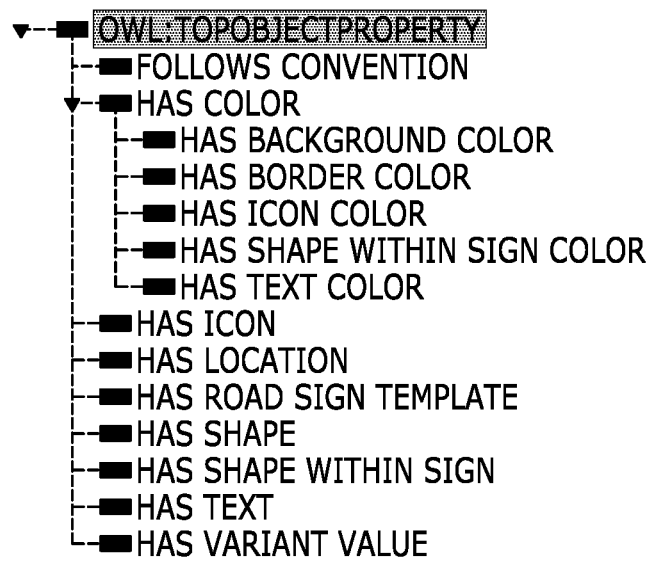
(B) OBJECT PROPERTIES
VISUALIZATION OF THE ROAD SIGN ONTOLOGY WITH PRO-TEGE [22]
FIG. 2

ROAD SIGN KNOWLEDGE GRAPH

PLEASE LOOK AT THE IMAGE CAREFULLY AND PROVIDE AN ANSWER FOR EACH QUESTION ON RIGHT.

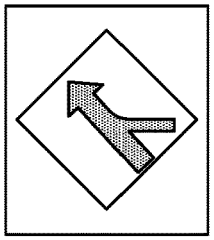

3. WHAT ARE OTHER GEOMETRIC SHAPES INSIDE OF THE PHYSICAL SIGN SHAPE YOU ANSWERED IN THE 1ST QUESTION? IF THERE ARE MANY ARROWS, MULTIPLE CHOICES ARE REQUIRED.

☐ ARROW TO INDICATE FORWARD
☐ ARROW TO INDICATE BACKWARD
☒ ARROW TO INDICATE RIGHT 3.1. WHAT ARE COLORS OF THIS SHAPE ?
☒ BLACK     ☐ BLUE      ☐ BROWN
☐ GREEN     ☐ ORANGE    ☐ PINK
☐ PURPLE    ☐ RED       ☐ YELLOW
☐ YELLOW-GREEN  ☐ WHITE

☐ ARROW TO INDICATE LEFT
☐ CIRCLE OR ELLIPSE
☐ CIRCLE WITH DIAGONAL LINE
☐ CIRCLE WITH HORIZONTAL LINE
☐ DIAMOND
☐ ZEBRA CROSSING
☐ TRIANGLE UP
☐ TRIANGLE DOWN
☐ TRIANGLE RIGHT
☐ TRIANGLE LEFT
☐ RECTANGLE
☐ OCTAGON
☐ PENTAGON

FIG. 4

SYSTEM AND METHOD FOR ROAD SIGN GROUND TRUTH CONSTRUCTION WITH A KNOWLEDGE GRAPH AND MACHINE LEARNING

TECHNICAL FIELD

The present disclosure relates to machine learning and road sign recognition.

BACKGROUND

Recognizing and understanding road signs are important features of advanced driver-assistance systems (ADAS), which are offered in modern vehicles via technologies such as road sign recognition (RSR) or intelligent speed adaption (ISA). Such features may be mandatory according to guidelines that vary by each country. Recent RSR and ISA solutions heavily use Machine Learning methods and require comprehensive, high-quality datasets of road sign annotation as ground truth. To be ready for real-world usage, the ground truth must be built from test drives around the world. The number of road sign images to be annotated can be enormous, up to more than ten millions each year, as is in the case of the ADAS development. Any representative sample of these images that covers enough countries and conditions will be of considerable size. It is therefore crucial to optimize the annotation task and minimize annotator's time in each session.

Road and traffic signs across multiple countries are very different. Signs in each county follow one of several conventions (e.g., Vienna Convention, SADC Convention, SIECA Convention and MUTCD Convention) but with variants. No universal machine classifier is available yet. To train such a universal classifier for signs in all countries, first there should be a large enough dataset including as many annotated signs as possible. It is very challenging for a human annotator to be knowledgeable of all road sings even in a single country. Therefore, a steep learning curve and thorough review process are necessary to generate high quality annotations. Annotation methods with Human-machine collaboration address efficient and scalable annotation.

SUMMARY

According to one embodiment, a system includes a knowledge graph. The system also includes a controller that is configured to detect and select a road sign identified across one or more frames of an image, output a prompt initiating a request for a classification of the road sign, classifying one or more images including the road signs, query the knowledge graph to obtain a plurality of road sign classes with a same attribute as candidate classes for a next classifier, and classify the road sign across the plurality of frames.

According to a second embodiment, a method of human and machine collaborated road sign detection and classification utilizing a knowledge graph is disclosed. The method includes detecting and selecting a representation of a sign across a plurality of frames, outputting a prompt initiating a request for a classification associated with the representation of the sign, classifying road signs and visual attributes on one or more images, querying the knowledge graph to obtain a plurality of road sign classes with at least one same attribute as the sign, classifying the sign in response to a confidence level from the model exceeding a threshold, and tracking the same sign across the plurality of frames.

According to a third embodiment, a system for road sign classification utilizing a machine learning model is disclosed. The system includes a display configured to output a user interface and a processor in communication with the display, the processor programmed to detect and select a representation of a sign across one or more images utilizing the machine learning model, output a prompt initiating a request for a classification associated with the representation of the sign, classify one or more images including the sign, obtain a plurality of road sign classes with at least one same attribute as the sign, and classify the sign across the one or more images in response to a confidence level exceeding a threshold.

BRIEF DESCRIPTION OF THE DRAWINGS

FIG. 2 illustrates a visualization of a road sign ontology.

FIG. 4 illustrates an example image of a crowd sourcing task utilizing a user interface according to an embodiment of the disclosure.

DETAILED DESCRIPTION

Figure 1:
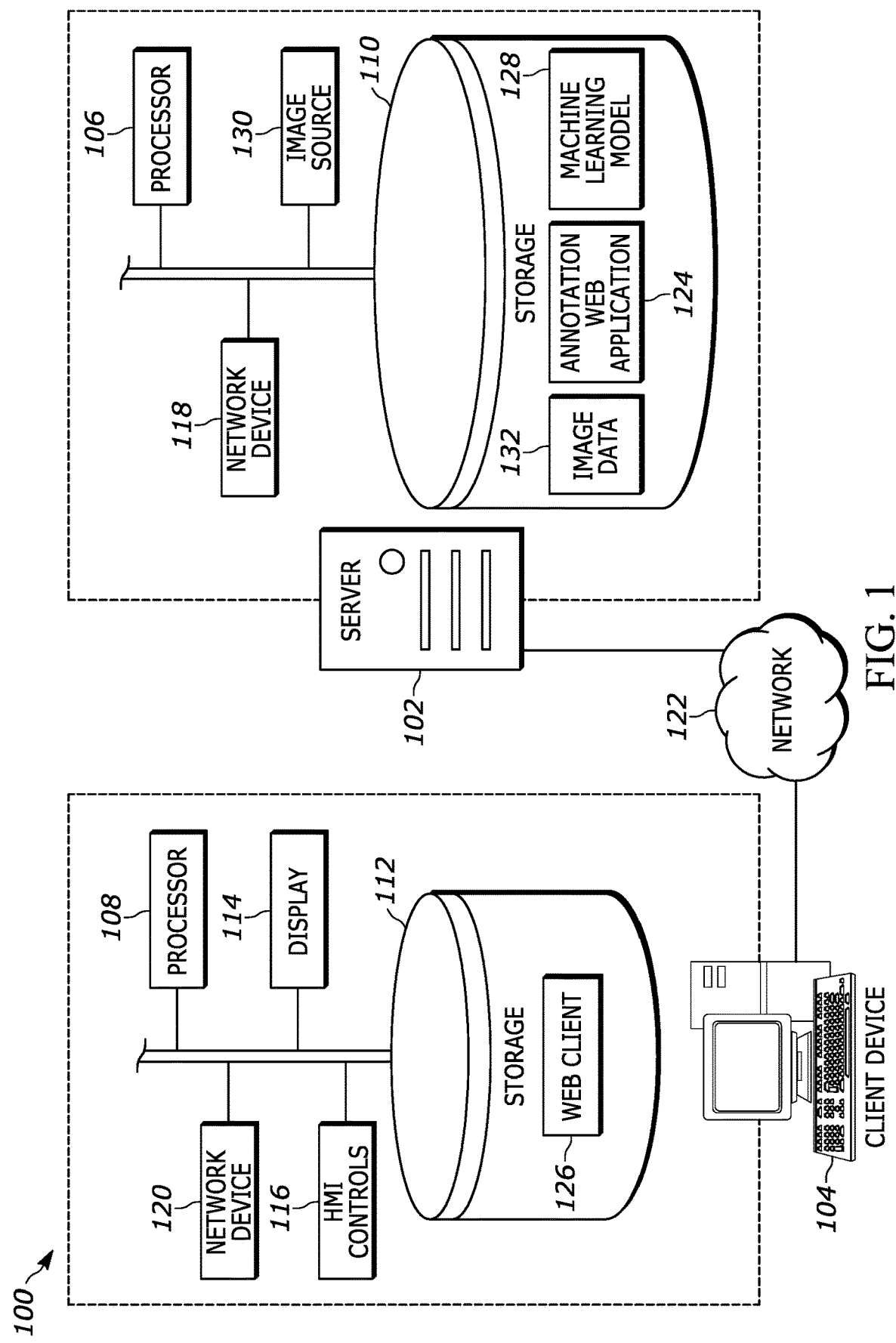
FIG. 1 illustrates an example annotation system for the capture and annotation of image data.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Having a comprehensive, high-quality dataset of road sign annotation is critical to the success of AI-based Road Sign Recognition (RSR) systems. In practice, annotators often face difficulties in learning traffic systems of different countries; hence, the tasks are often time-consuming and produce poor results. The embodiments below described a system that utilizes knowledge graph and machine learning models that classify various road signs and/or classify visual attributes of road signs, which can calculate distances between a real sign on an image and sign prototypes represented in a latent space to provide ranked sign prototypes matching with a real sign on an image—to assist annotators in classifying road signs effectively. Annotators can query the Road Sign Knowledge Graph using visual attributes and receive closest matching candidates suggested by the model. The model uses the candidates from the knowledge graph and a real sign image patch as inputs. Such an embodiment utilizing a knowledge graph approach can reduce sign search space. Furthermore, with a machine learning model, our system can propose the correct single candidate by and large, reducing the human search effort fairly.

There are two main challenges in performing a road sign annotation task. First, there are many road signs to search through to find a matching one (USA alone has more than 800 federally approved road signs, and more than 10 states in USA have their own state conventions which are different from the Federal Convention. This makes manual classification of each sign instance against a full palette of signs infeasible. One solution is to have a machine learning system limit the number of candidates for human annotators to search from (e.g., to 5 signs). The second challenge lies in the fact that different countries follows different conventions on road signs. For instance, USA follows MUTCD, while European countries adopt the Vienna convention. Some countries adopt multiple conventions, and some introduce different variants in features such as colors, fonts, size, etc. No annotator possesses full knowledge of all road sign systems and may choose the wrong ones, especially when the instance is not clear (e.g., gray-scale images, night images, and so forth).

The embodiments below may aim to reduce efforts for human annotators by providing machine-guided annotation and reduce the human cognitive load with a smaller number of road sign candidates during the detection and classification phase, and apply human-machine collaborated tracking for the identical road sign across frames.

The system described below may utilize an image as input to a machine learning model that has a signed detection. If the sign detection fails or is not able to recognize a sign in the image, the system may utilize a human annotator to depict a bounding box around the image. The system may retrieve specific input from the annotator to improve the machine learning model and system. Such input may include information about visual attributes (e.g., shape, color, etc.). For example, the system may utilize a knowledge graph to identify wrong visual attributes about the sign for correction. The system may also work to receive the visual attributes if the classifier identifies a wrong sign classification. Thus, the input retrieved regarding the visual attributes may be utilized to improve the machine learning model.

The system described below may obtain best estimation (detection, category, shapes, color, sign text, etc.) of the signs using various machine learning models. Additionally, system may utilize abductive reasoning to infer road sign candidates through a knowledge graph. Furthermore, the system may create microtasks dynamically for human annotators to complete annotation (e.g., getting missing information, contextual information, validating machine learning prediction, etc.) also with machine interactions. Track the identical sign object across frames either automatically (by machine learning algorithms), manually (by human) and semi-automatically (by human machine interaction)

The issues may be resolved by combining a knowledge graph and machine learning to assist annotators and accelerate the ground truth annotation. There may be a basic assumption that all road signs have some basic visual features, and the system can navigate through the knowledge graph of these visual features (focusing on country-specific sub-graphs by using GPS data associated with such images), to locate the candidate signs, and supporting the sense-making of human annotators. The reduction in search space may translate to reduced search effort and time by annotators (e.g., human annotators) for locating a correct sign. To further reduce the search space, the system may utilize a machine learning model that utilizes one-shot learning to find matching signs, even if unseen in prior training data. The system may thus introduce Road Sign Ontology (RSO) to represent salient features of road signs, proposed crowdsourcing techniques to contrast the Road Sign Knowledge Graph at scale across countries and states, and a build a machine learning model that is combined with the knowledge-graph to further rank sign candidates with (normalized) prediction scores.

FIG. 1 illustrates an example annotation system 100 for the capture and annotation of image data 132. The annotation system 100 includes a server 102 that hosts an annotation web application 124 that is accessible to client devices 104 over a network 122. The server 102 includes a processor 106 that is operatively connected to a storage 110 and to a network device 118. The server 102 further includes an image data input source 130 for the receipt of image data 132. The client device 104 includes a processor 108 that is operatively connected to a storage 112, a display device 114, human-machine interface (HMI) controls 116, and a network device 120. It should be noted that the example annotation system 100 is one example, and other systems 100 may be used. For instance, while only one client device 104 is shown, systems 100 including multiple client devices 104 are contemplated. As another possibility, while the example implementation is shown as a web-based application, alternate systems may be implemented as standalone systems or as client-server systems with thick client software.

Each of the processor 106 of the server 102 and the processor 108 of the client device 104 may include one or more integrated circuits that implement the functionality of a central processing unit (CPU) and/or graphics processing unit (GPU). In some examples, the processors 106, 108 are a system on a chip (SoC) that integrates the functionality of the CPU and GPU. The SoC may optionally include other components such as, for example, the storage 110 and the network device 118 or 120 into a single integrated device. In other examples, the CPU and GPU are connected to each other via a peripheral connection device such as PCI express or another suitable peripheral data connection. In one example, the CPU is a commercially available central processing device that implements an instruction set such as one of the x86, ARM, Power, or MIPS instruction set families.

Regardless of the specifics, during operation, the processors 106, 108 execute stored program instructions that are retrieved from the storages 110, 112, respectively. The stored program instructions accordingly include software that controls the operation of the processors 106, 108 to perform the operations described herein. The storages 110, 112 may include both non-volatile memory and volatile memory devices. The non-volatile memory includes solid-state memories, such as NAND flash memory, magnetic and optical storage media, or any other suitable data storage device that retains data when the annotation system 100 is deactivated or loses electrical power. The volatile memory includes static and dynamic random-access memory (RAM) that stores program instructions and data during operation of the annotation system 100.

The GPU of the client device 104 may include hardware and software for display of at least two-dimensional (2D) and optionally three-dimensional (3D) graphics to a display device 114 of the client. The display device 114 may include an electronic display screen, projector, printer, or any other suitable device that reproduces a graphical display. In some examples, the processor 108 of the client 104 executes software programs using the hardware functionality in the GPU to accelerate the performance of machine learning or other computing operations described herein.

The HMI controls 116 of the client 104 may include any of various devices that enable the client device 104 of the annotation system 100 to receive control input from workers or other users. Examples of suitable input devices that receive human interface inputs may include keyboards, mice, trackballs, touchscreens, voice input devices, graphics tablets, and the like.

The network devices 118, 120 may each include any of various devices that enable the server 102 and client device 104, respectively, to send and/or receive data from external devices over the network 122. Examples of suitable network devices 118, 120 include a network adapter or peripheral interconnection device that receives data from another computer or external data storage device, which can be useful for receiving large sets of data in an efficient manner.

The annotation web application 124 be an example of a software application executed by the server 102. When executed, the annotation web application 124 may use various algorithms to perform aspects of the operations described herein. In an example, the annotation web application 124 may include instructions executable by the processor 106 of the server 102 as discussed above. Computer-executable instructions may be compiled or interpreted from computer programs created using a variety of programming languages and/or technologies, including, without limitation, and either alone or in combination, JAVA, C, C++, C #, VISUAL BASIC, JAVASCRIPT, PYTHON, PERL, PL/SQL, etc. In general, the processor 106 receives the instructions, e.g., from the storage 110, a computer-readable medium, etc., and executes these instructions, thereby performing one or more processes, including one or more of the processes described herein. Such instructions and other data may be stored and transmitted using a variety of computer-readable media.

The web client 126 may be a web browser, or other web-based client, executed by the client device 104. When executed, the web client 126 may allow the client device 104 to access the annotation web application 124 to display user interfaces of the annotation web application 124. The web client 126 may further provide input received via the HMI controls 116 to the annotation web application 124 of the server 102 over the network 122.

In artificial intelligence (AI) or machine learning systems, model-based reasoning refers to an inference method that operates based on a machine learning model 128 of a worldview to be analyzed. Generally, the machine learning model 128 is trained to learn a function that provides a precise correlation between input values and output values. At runtime, a machine learning engine uses the knowledge encoded in the machine learning model 128 against observed data to derive conclusions such as a diagnosis or a prediction. One example machine learning system may include the TensorFlow AI engine made available by Alphabet Inc. of Mountain View, Calif., although other machine learning systems may additionally or alternately be used. As discussed in detail herein, the annotation web application 124 and machine learning model 128 may be configured to recognize and annotate features of the image data 132 for use in the efficient and scalable ground truths generation system and methods to produce high precision (pixel level accuracy) annotations that are used to develop object detection/localization, object tracking.

The image data source 130 may be a camera, e.g., mounted on a moving object such as car, wall, pole, or installed in a mobile device, configured to capture image data 132. In another example, the image data input 132 may be an interface, such as the network device 118 or an interface to the storage 110, for the retrieval of previously-captured image data 132. The image data 132 may be video, e.g., a sequence of images. Each image in the image data 132 may be referred to herein as a frame. For privacy concerns, faces and license plates may be blurred from the image data 132 for certain annotation tasks.

The annotation system 100 may also include a knowledge graph that may be utilized. The knowledge graph (KG) may represent a collection of interlinked descriptions of entities—real-world objects, events, situations or abstract concepts—where the descriptions utilize a formal structure that allows both people and computers to process them in an efficient and clear manner. The knowledge graph may be a type of database. The entity descriptions may contribute to one another, forming a network, where each entity represents part of the description of the entities, related to it.

FIG. 2 illustrates a visualization of a road sign ontology. The system may utilize Road Sign Ontology (RSO) and its conformant knowledge graph (described in more detail below) to assist in the data annotation process and the training of the machine learning models for road sign classification. The RSO may seek to represent the salient visual features of a road sign that are discernible through sight or imagining and is modeled using the Web Ontology Language. FIG. 2 may be an example for visualization of the primary ontology concepts.

The ontology of an RSO may represent the features of road signs that are beneficial to the performance of machine learning algorithms. Additionally, the ontology should represent concepts at an appropriate level of granularity that enables annotators to effectively identify road signs and their visual features when reviewing or viewing an image. Some of the primary features of the road sign may be represented to be included in its shape, color, text and printed icons. RSO distinguishes between two types of shapes associated with a road sign. The most obvious is the shape of the physical plate. For example, in the United States, stop signs have an octagon shape, yield signs have a downward triangle shape, and speed limit signs have a rectangular shape. There are 11 different shapes that the physical plate of a road sign could take. The second type of shape includes geometric shapes that are printed on the physical plate. Common printed geometric shapes include arrows, circles, and diagonal lines. RSO represents 9 different printed shapes.

The RSO may also distinguish between the color of road signs. Similar to shape, the RSO distinguishes between multiple different types of color associated with a road sign. Specifically, a road sign can have a foreground color, a background color, and a border color. 11 common colors, for example, may be enumerated within the ontology.

Icons are a special type of shape printed on a road sign that depict various objects. The types of objects often depicted include vehicles, people, animals, and assorted traffic infrastructure (e.g., a traffic light). Given the large number of possible distinct icons, RSO only defines a few common categories, including: animal, infrastructure, nature, person, vehicle, and other.

The RSO may also recognize the various text of road signs. Many road signs include printed text. Stop signs print the word STOP, yield signs print the word YIELD, and speed limit signs include both the words Speed Limit and a number. Rather than enumerating all possible text that may be printed on a sign, RSO allows the text of a specific sign to be annotated using an OWL Datatype Property. While RSO may not define enumerations for all possible text on a road sign, it does enable the categorization of text into various types, based on the intended meaning or use. The categories of text may include, but not be limited to, speed, height, weight, time, name, and number. As an example, the text of a speed-limit sign may be identified with the speed category, while the text of a sign announcing entrance to a town is identified with the name category.

The road signs may adhere to convention and allow for the person to detect and identify the meaning of a sign with only a brief glance, thus allowing a driver to not utilize much cognitive load. Such conventions may define rules and constraints on how road signs and various types may be printed and/or displayed. Some road sign conventions may include the Vienna Convention (mostly in Europe and China), the MUTCD (Manual on Uniform Traffic Control Devices) Convention (use mostly in the United States), and the SADC (South African Development Community) Convention (mostly used in Africa). Variations of these conventions may be defined and used for more specific geo-spatial regions. For example, each state in the United States may either adhere to the federal version of MUTCD or may define their own state-specific version. Each road sign represented by RSO may be associated with the convention to which it adheres.

The conventions may also provide standard images that depict the sign. Such standard images are often referred to as prototypes and provide a template for the design, construction, and illustration of signs in manuals. Prototypes often come in two versions, a full color version and a gray-scale version. RSO may enable road signs to link to these prototype images on the Web.

Figure 3:
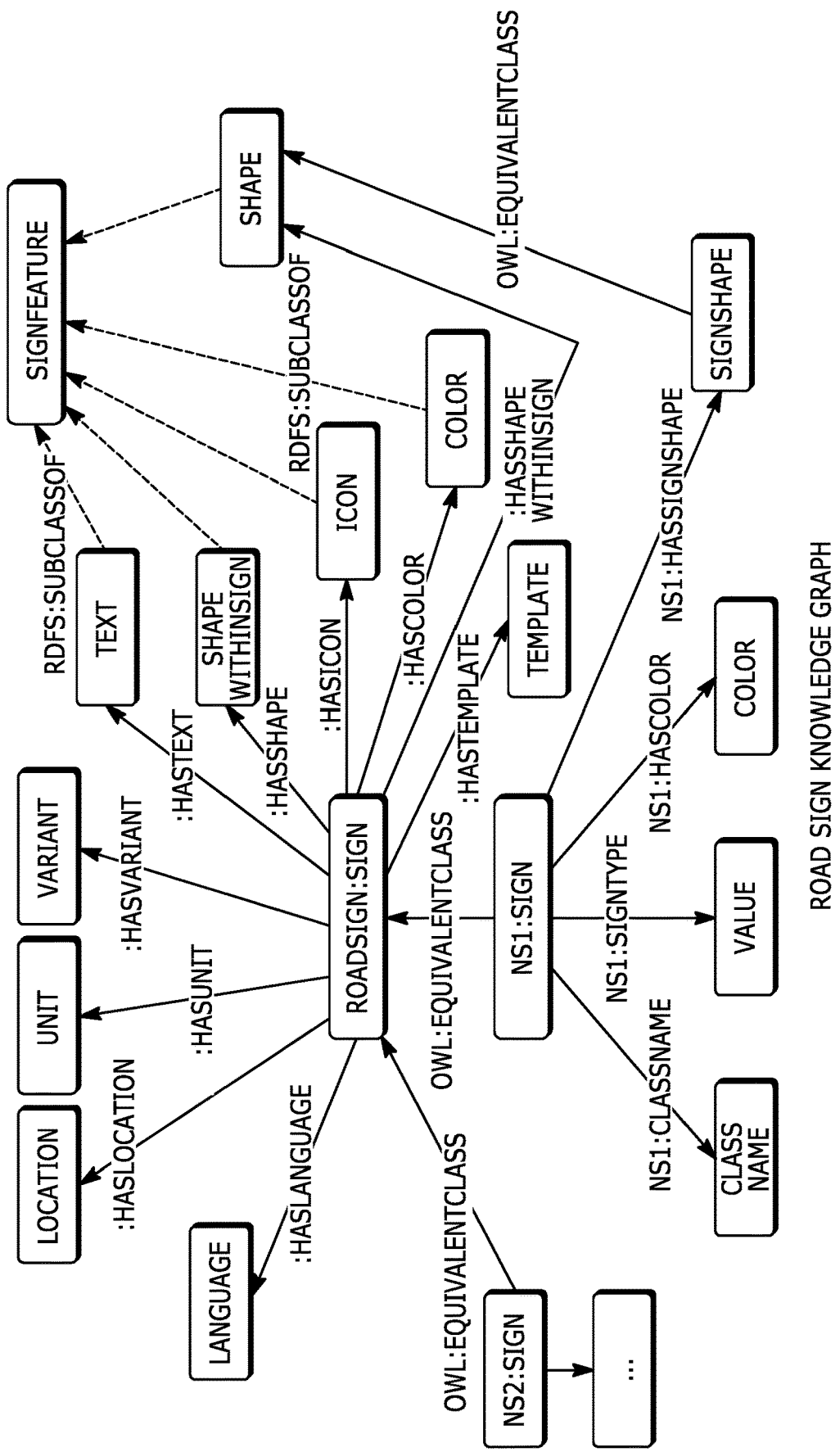
FIG. 3 illustrates an example of aligning the concept of a road sign in RSO with utilization of other vocabularies.

FIG. 3 illustrates an embodiment of a road sign in Road Sign Ontology with other vocabulary concepts in a knowledge graph. The knowledge graph may need to enable the recognition of road signs and different applications. However, building the knowledge graph manually may both be time consuming and difficult due to lack of comprehensive domain knowledge of annotators. The following system may work on a two-step system: 1) Relying on the crowd (e.g., crowd-sourcing) to construct the large-scale graphs with basic properties; and 2) Aligning and extending the graphs to "fine-tune" to domain-specific data and vocabularies.

FIG. 4 illustrates an example image of a crowd sourcing task utilizing a user interface according to an embodiment of the disclosure. In the such a task, the system may create a web-based application for crowd source workers or applications to use to extract the sign features utilized for constructing the road sign knowledge graph. As shown on the user interface, the interface may show for features related to the road sign template by asking for input related to the plate shape, background color, border color, additional shapes (e.g., left arrow) inside the plate, icons (e.g., vehicle), text and variants (e.g., street name) if applicable. The microtask can be done by any crowd works and does not require road sign knowledge, e.g., the meaning of a given road sign template. All answers can be selected from the provided options, except text that should be input into the text field. Therefore, the system does not specific any qualification nor require any training, but simply provides instructions with examples. The system may model a "gold standard" road sign for which the system may know the ground truth amount ten road sign templates in order to screen scammers who may intentionally try to fool the various micro-tasks. Each individual sign template may be presented to one work, and one internal expert may review the answers from the work, followed by an additional review with another internal expert for further clarification if necessary. For context, the road sign template may refer to a prototype image that may be extracted from a convention document (e.g., MUTCD). The road sign may refer to a real physical sign on the image collected by a camera. The icon may be a symbol (e.g., a person, vehicle, etc) found in a road sign or road sign template.

As the number of localized road signs become considerably large and require people to know different languages used in different locations, the system may leverage crowds recruited from various crowd-sourcing markets places with global registered work forces or internal workforces.

The system may first work to identify road sign templates for various countries. In the first task, the system may ask the crowd to find a Web site that provides official road sign documents having templates of the road sign for a target country or state. The system may then ask at least three crowd workers to get consensus on recommended sources. After identifying a source, manual template extraction may be required if the identified resource does not support a separate image file format for each road sign template.

Validated attributes may be extracted from the sign template and are translated into RDF facts of corresponding entity of type Sign in the generic knowledge graph. The system may then be refined to produce different domain-specific graphs. In order to get the knowledge graph specific to different domains, the system may first create a separate graph for each domain from the relevant sub-graph of the generic knowledge graph. For instance, a sub-graph containing all facts about a target country or state. The system may then perform alignments to extend and refine the domain-specific graphs.

One alignment may include automated reasoning. As the RSO may be compliant to OWL-DL, the system may perform semantic reasoning to add more facts, such as adding category to the sign via its color and shapes. The reasoning can also create facts in different granularity. For example, the property has foreground color and can be refined to have icon color, text color, shape, and a sign color using the subsumption, or mapped to a more generic property that has color.

Another alignment may include an auto-transformation for individual triples. If the content in a triple in the generic graph is transformable, the system may apply rules to get more facts. For instance, the text "SPEED LIMIT 30" can be transformed into two triples with "SPEED LIMIT" as text and 30 as a numerical value in the domain-specific graph.

Another type of alignment may simply be a manual alignment. Experts of ontology alignment may also be advised to add new vocabularies into the domain-specific graphs when needed. For example, the category/class names may be used in a domain may often be acronyms, which cannot be automated without additional inputs. Thus, a manual alignment or input may need to be added by an annotator.

As a result of the alignments (or various forms of alignment), a generic road sign knowledge graph and multiple domain-specific graphs may result. The graphs may be regularly be reviewed by domain experts using other web-based applications, including an inhouse application. The knowledge graphs may be stored and processed in an Enterprise Cluster. The system may utilize a database to store intermediate annotations and perform multiple validation before it is stored in the Cluster. The system may utilize various apps to convert a Web application data model to the triples that follow an RSO. The system may utilize built-in semantic reasoning and regular expression capabilities in the Enterprise Cluster to perform graph alignment.

The task for human annotators may be to draw a bounding box around a road sign on an image and select a matching sign prototype from a small palette of signs. The system may not expect that the human annotators possess knowledge on traffic systems which often vary across countries. Furthermore, the simple task does not require a separate training session about road signs to complete. Instead, the annotators may interact with the system by providing road sign features which are visible inside of the bounding box that they draw on the Web UI. The annotator may provide plate sign shape and background color as common attributes, and icons, text, and additional shapes as optional attributes. Then, the annotators may be asked to select a sign template out of top K candidates, based on visual match, which the average person can perform. The task execution time and quality may depend on the search space, i.e., the number of candidates that they have to visually compare, as well as the image quality.

The tools of the system may support annotators by providing a handful of road sign candidates that match the attributes given through a knowledge graph search. If the number of sign candidates is greater than a threshold K, then a machine learning model may be applied to further reduce the number of candidates.

The system may integrate a machine learning model such as one-shot classifier to predict top-K road sign template candidates that are similar to a cropped image patch containing a road sign. The inputs for this model may be (1) a cropped image patch around the bounding box that the annotator draws on the real road image, and (2) sign templates filtered by the Road Sign Knowledge Graph. These two inputs above may be encoded into the latent space, and the nearest neighbor classification may be used to rank the road sign templates. The system may return the top K candidates back to the human annotator. Prediction of unseen classes may be crucial in the road sign annotation due to rare road signs in the long tail. Model prediction of conventional classification with known classes may assist human annotators effectively unless that model may be trained with large datasets that include rare classes. The encoder in the training phase of such a model encodes real images to latent distribution and the decoder reconstructs the encoded distribution back tot a prototype that corresponds to the input image. By doing so, the trained encoder may be used as a feature extractor and the model learns image similarity and prototypical concepts instead of learning classification itself. Therefore, the pre-trained model can predict novel classes that are unknown during the training time.

Figure 5:
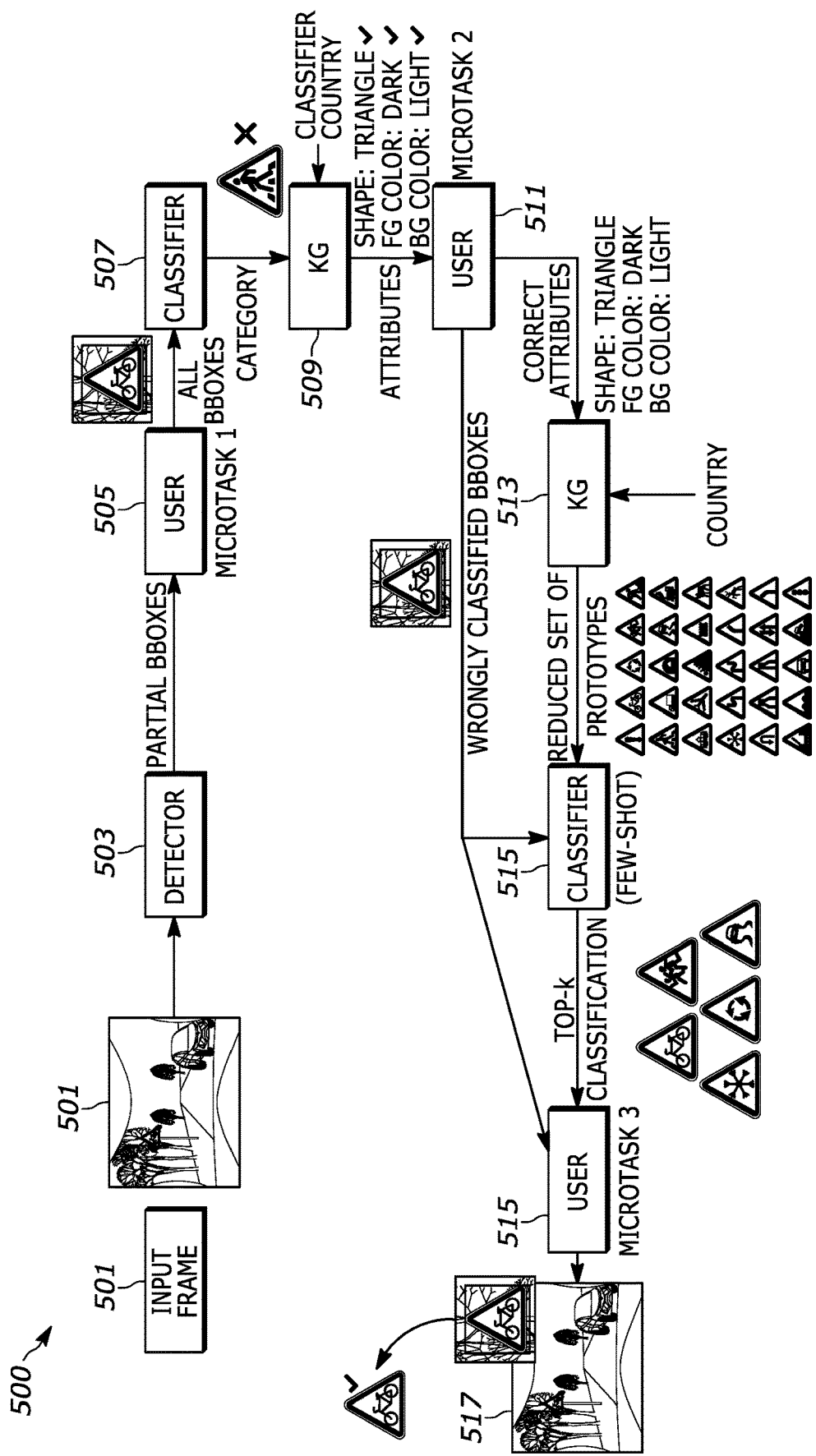
FIG. 5 discloses a road sign workflow address usages of machine learning training and annotation process.

FIG. 5 illustrates an example of human and machine collaborated road sign detection and classification process to address usages of machine learning training and annotation process. An input frame 501 may be received from one or more cameras or sensors located on a vehicle that is collecting data on the road. The received images and videos may be retrieved from the camera and sent to the detector 503. The detector may be automated to identify bounding boxes around all notified road signs utilizing various algorithm with recognition capabilities.

Given an image, the system 500 may first run a road sign detector 503 then human verify and correct locations of all signs in the image. The human verification can be done at a first instance or at another different subsequent instance. The detector 503 may provide partial bounding boxes around various road signs identified in the input frame 501. The system 500 may then run a classifier 507 (such as a naive classifier) on each road sign. Classification can be done by a single classifier 507 or combination of classifiers 507 to predict partial attributes of road signs such as shape, color, sign text (e.g., the value of speed limit). If this classification is wrong (verified by human), the system may use the wrong classification to query a knowledge graph 509 to get missing attributes of the sign. A user 511 may be utilized to identify if the sign is correct, or it may be automated utilizing machine learning. The system may also query the knowledge graph 509 if the confidence level is below a threshold or if the sign is unidentifiable. The user 511 may be utilized to correct attributes identified by the system 500, such as by the knowledge graph or machine learning model. Using these attributes, the system may query the knowledge graph 513 again to obtain the set of all road sign classes which have the same attributes as candidate classes for the next classifier.

The next classifier 515 may be a one-shot classifier based on an encoder, such as a vibrational prototyping encoder, which learns a similarity metric to classify images at test time using a single prototype for each road sign within the candidate classes. This approach is ideal for unseen signs for which data is unavailable but a prototype sign is available. The reduced candidate classes by knowledge graph improves the classification accuracy. However, there could still be a large number of candidate classes with the same attribute. For example, in the US, there are more than 50 signs that are diamond-shaped with black foreground color and yellow background color. To improve the one-shot classifier, we introduce metric learning, such as triplet loss, during training to further separate different classes in the embedding space. The top-k outputs from this classifier are finally presented to the crowd worker which reduces his effort considerably as compared to the existing annotation pipelines.

Figure 6A:
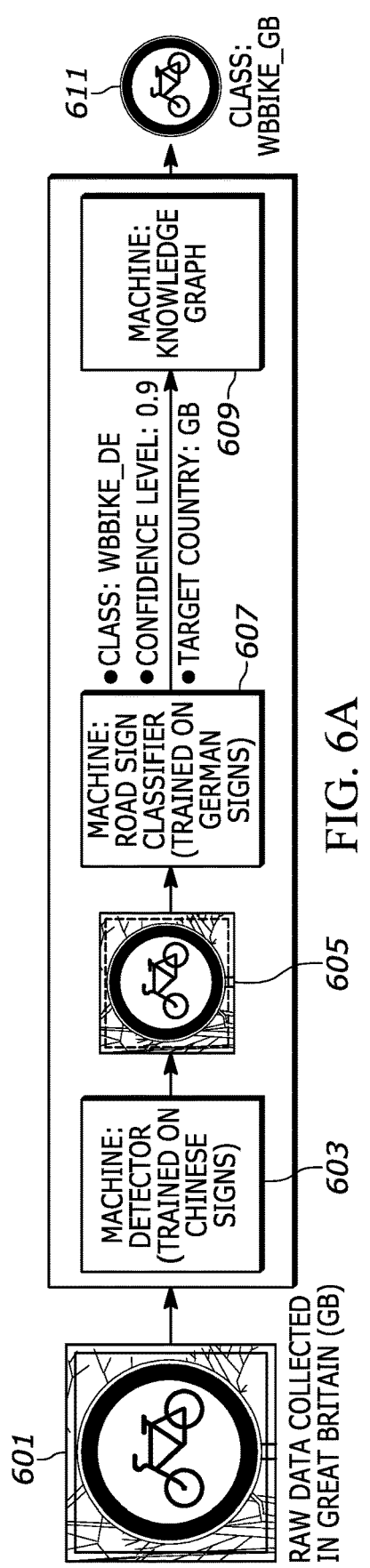
FIG. 6A illustrates a fully automated road sign annotation for a different country.

FIG. 6A illustrates an automated road sign annotation for a different country. The raw data 601 may be collected in one country, for example, Great Britain. However, the machine learning detector 603 may be trained on Chinese signs. As such, the system may not understand exactly what the sign 605 is referred to. The detector 603 may look for specific attributes to identify in the sign, such as the circle shape. Next, the system may identify a corresponding classifier as it is trained on a neighboring country or another European country, such as the German signs. The system may classify that the identified sign has a high confidence level for a bicycle sign in Germany, but the target country is in Great Britain. As such, the system may utilize a knowledge graph to help classify the icon for Germany.

Thus as shown, automatic pre-labeling may be done. Countries adopting the same convention have same sign representation but can have a different sign class in the instant system. The system provides an automatic classification for a target country with inference in knowledge graph. The example described above shows that a machine learning model trained with a dataset for Germany road signs predicts a bicycle lane indication sign class in German road signs. Then the knowledge graph inference engine can find a corresponding sign class in Great Britain road signs 611.

Figure 6B:
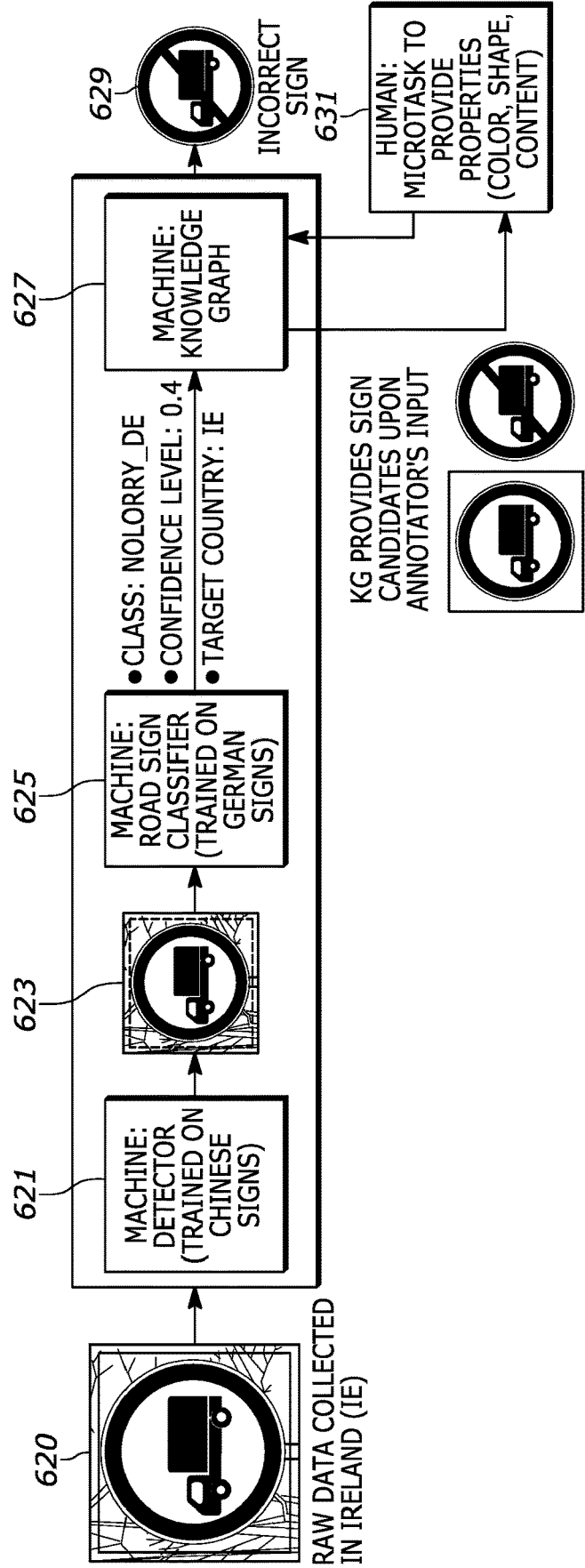
FIG. 6B illustrates semi-automated road sign annotation for a different country.

FIG. 6B illustrates semi-automated road sign annotation for a different country. In such an example the collection may be in one country, Ireland but utilized on a machine learning model for China. The raw data 620 may be collected in Ireland. The ML detector 621 may be trained on Chinese signs and identify the sign 623. The ML road sign classifier 625 may be utilized for German signs as it is a country closer to Ireland and in Europe. The Classifier may classify the sign with a low confidence level and understand that the target country is Ireland. The system may utilize the Knowledge Graph 627 to identify a sign, however, it may be an incorrect sign 629. An annotator, (which may be a human annotator) may provide the properties 631 of the sign, including the color, shape, content, etc. The Knowledge Graph may provide sign candidates upon the annotator's input to select from. Thus, the human annotator can provide closest guesses rather than sifting through hundreds, if not thousands, of possible candidates. Thus, in a case machine classifier(s) are not able to predict a road sign class with high confidence, human annotation task with knowledge graph can reduce the search space for road sign candidates. The system may include a threshold confidence level in order to provide sign candidates, such as a 40% confidence level. However, any percentage of a confidence level may be utilized as the threshold to define whether additional input is needed from the annotator and possible candidates should be output. This approach requires less cognitive load for a human annotator compared to a brute-force approach to find a correct road sign class amongst hundreds of road sign candidates in a target country.

Figure 6C:
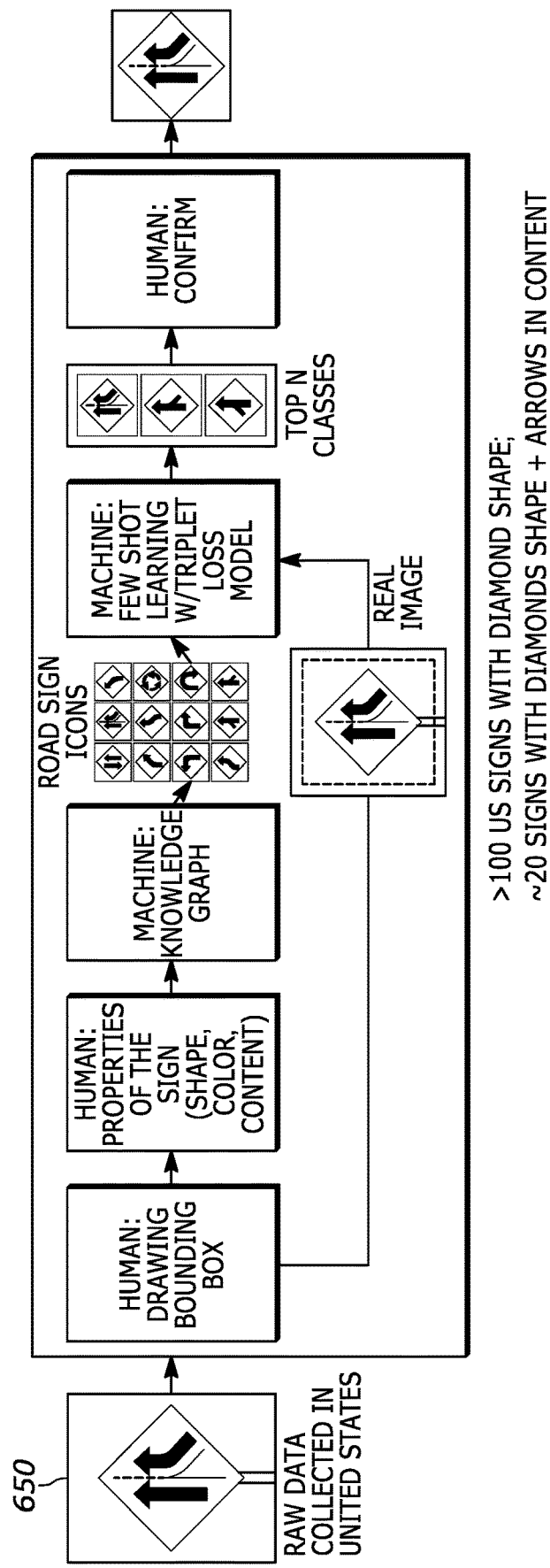
FIG. 6C illustrates a human initiated semi-automated labeling system.

FIG. 6C illustrates a human initiated semi-automated labeling system. In such an embodiment, road signs which have not been used in machine training can be predicted as top K candidates. The example shows that machine is not able to detect a road sign in a given image 650, then a human draws a geometric shape (e.g., bounding box) to indicate a road sign followed by attributes of this road sign. If the sign cannot be predicted, the system may output a request to draw a bounding box. The system may receive input associated with a bounding box around an image (e.g., certain pixels). The system may also seek to request input associated with properties of the sign, such as shape, color, content, etc. that it will receive as input. The Knowledge Graph may be used to find matching road sign candidates with their prototypical images (road sign templates) based on human annotators' input on attributes. The system may output road sign icons along with the image patch (cropped based on human annotator's input of a geometric shape) that are used for few shot learning classifier that produces top K candidates. The search space (# of candidates) may be reduced by the Knowledge Graph provides a better prediction in few shot learning classifier. When the annotator confirms the correct image, the input may be saved for future reference in order to eliminate the need for human input and annotators.

Figure 7:
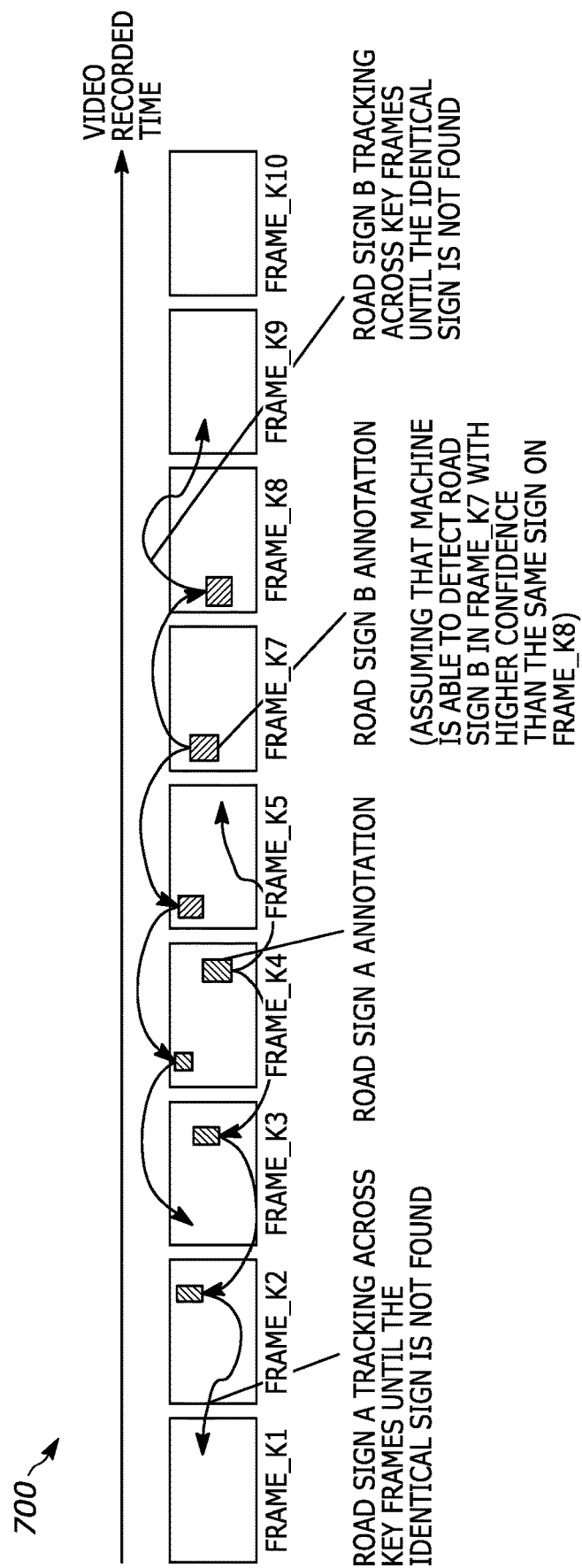
FIG. 7 illustrates an example of tracking road signs across multiple frames.

FIG. 7 illustrates an example of tracking road signs across multiple frames. As shown in FIG. 7, the road sign may be explored through the video recorded times. The system may first select the best representation of a sign across the frames and ask for an annotation agent to classify it. Then, the annotation agent may move through other frames where the signal appears and specifies that these sign-instances are the same sign. By doing so, the classification of a sign may only need to be performed once and the same ID will be assigned for all instances of that sign across the frames. Depending on the performance of an annotation agent, detection (identifying the position of the sign), classification (specifying what sign it is) and tracking (giving the same ID to all instances of a sign across frames) can be done by a human annotator, machine (e.g., machine learning model or AI), or via a hybrid machine-human approach.

At a first frame, and road sign A tracking across key frames in backward or forward until the identical sign is not found. Either a machine tracking algorithm or human annotator may track the identical sign. The system may identify a road sign B annotation in another frame. This may be assuming that the machine is able to detect road sign B in frame X with higher confidence than the same sign on frame_k8. The road sign B may be tracking across key frames in backward or forward until the identical sign may not be found.

Figure 8A:
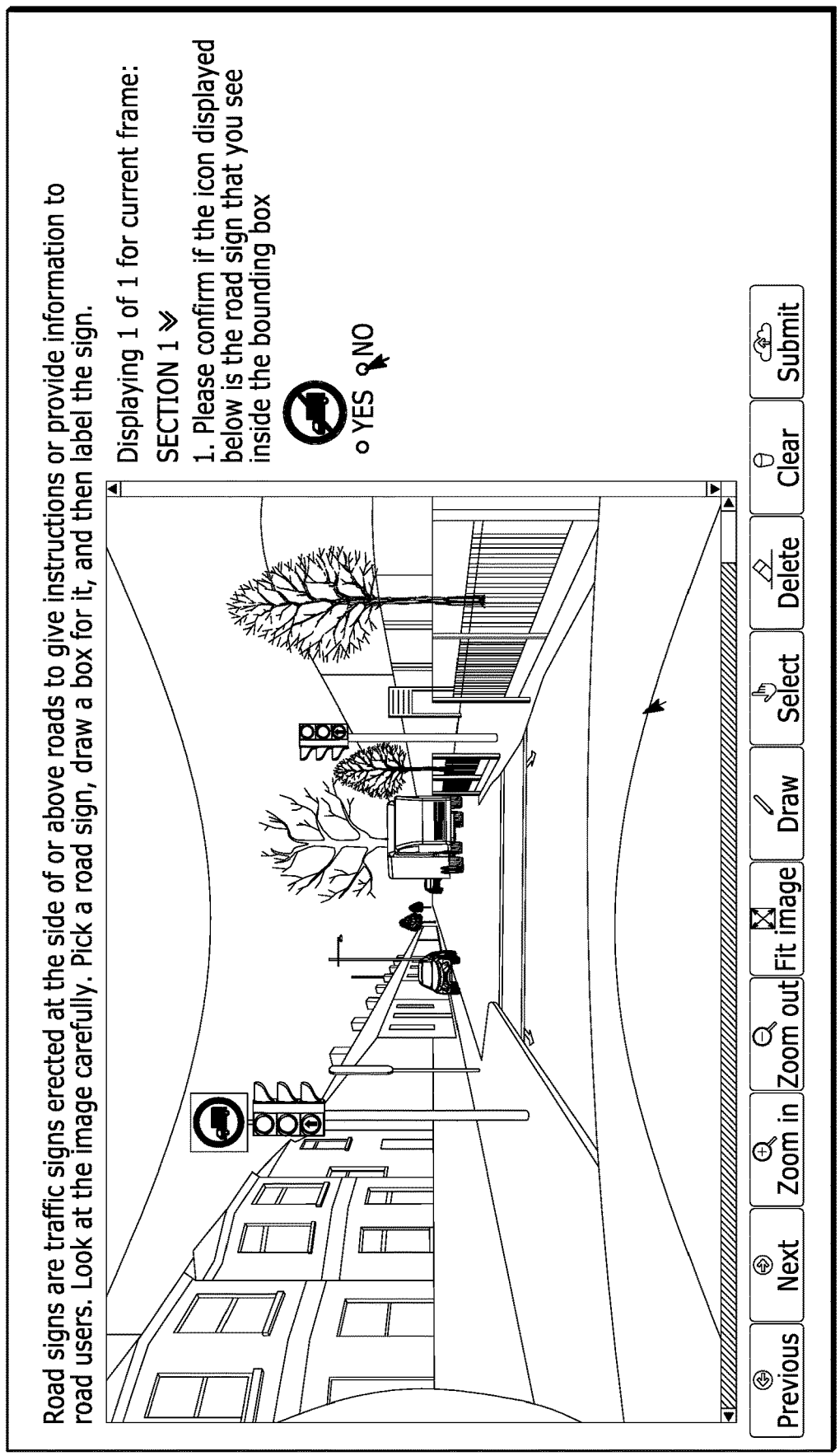
FIG. 8A illustrates an example of a user interface associated with the knowledge graph.
Figure 8B:
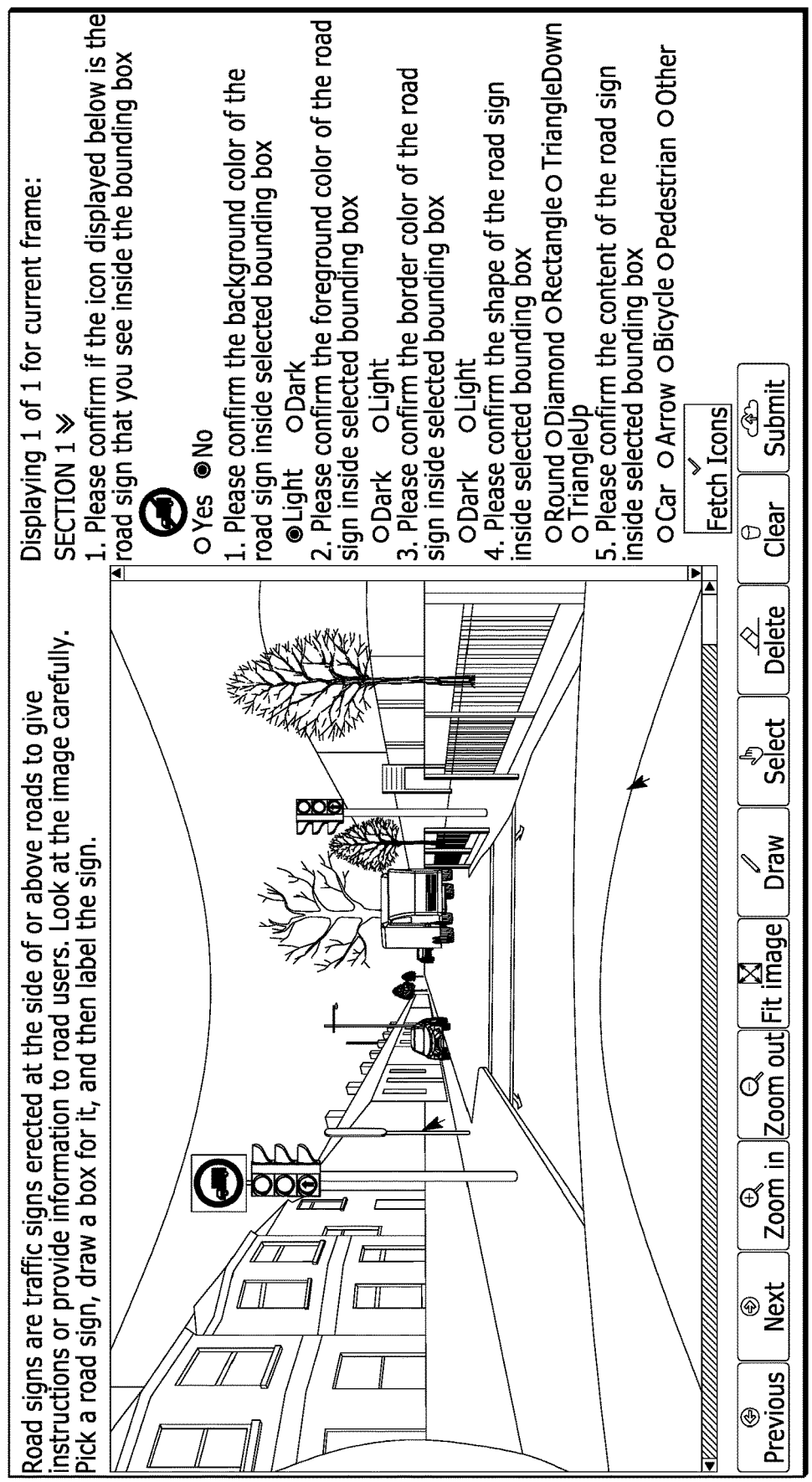
FIG. 8B illustrates an example of the user interface when the road sign is classified improperly.
Figure 8C:
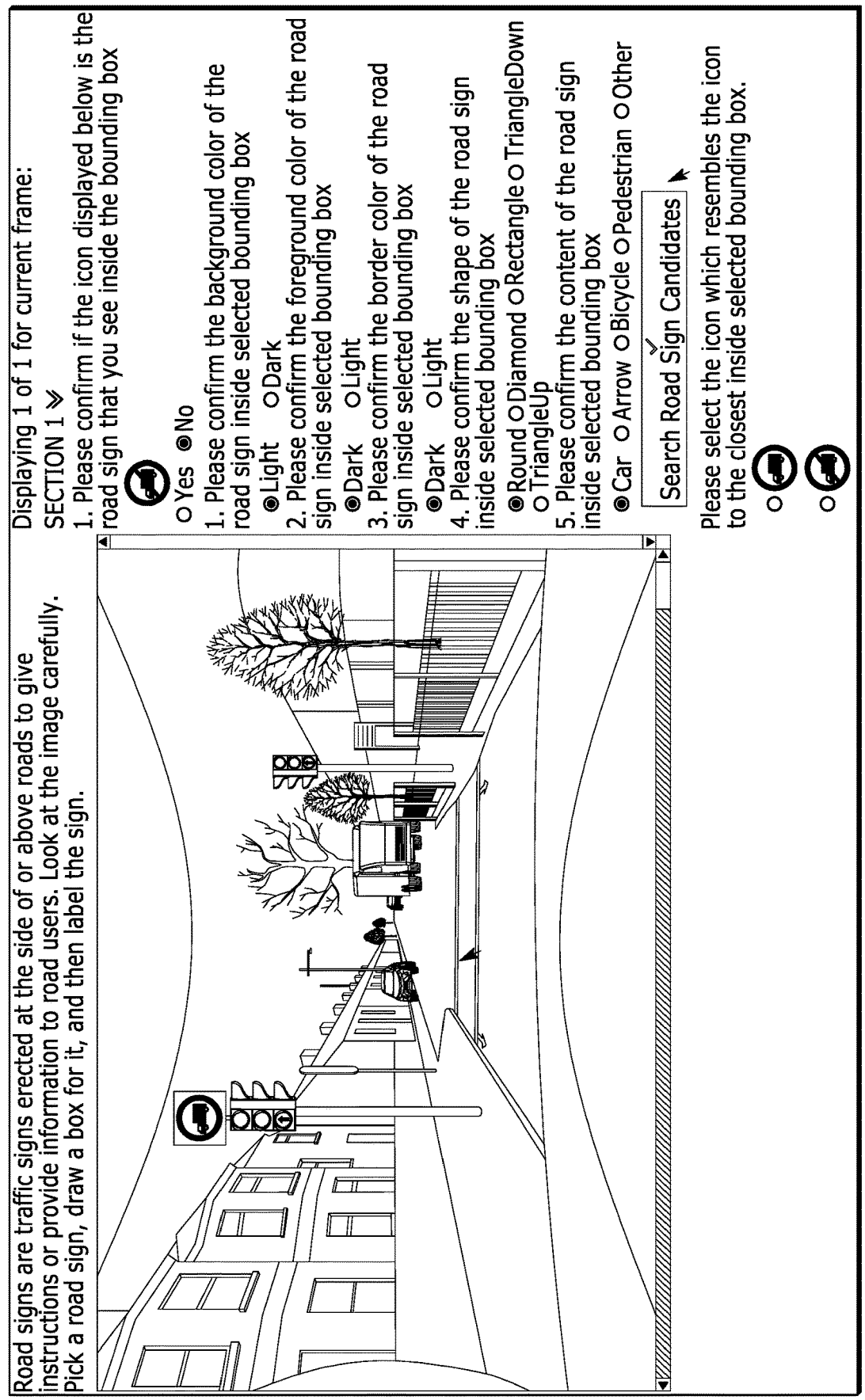
FIG. 8C illustrates an example of a user interface associated with the knowledge graph when a road sign classification is incorrect, and input is received at the user interface.

FIG. 8A illustrates an example of a user interface associated with the knowledge graph. As shown in FIG. 8A, a road sign located on the image 801 may be different than the road sign template 803 that shown as identified and classified by the system. The interface may request input from the user confirming if the bounding box 801 matches the identified template 803 according to the machine learning model. FIG. 8B illustrates an example of the user interface when the road sign is classified improperly. As shown, the input may identify that the classification is incorrect. As such, the system and interface may output several questions FIG. 8C illustrates an example of a user interface associated with the knowledge graph when a road sign classification is incorrect, and input is received at the user interface. As shown in FIG. 8C, a road sign located on the image 801 is different than the template 803 that shown as identified and classified by the system. As shown the system may output questions related to whether the sign image shown in the drawing matches that as classified in question 1 and identified in template 803. If the input received states no, additional questions may be added. For example, the system may confirm if the background color of the road sign is "light" or "dark", if an image is greyscale. Question 2 may ask whether the "foreground color" is light or dark. Question 3 may ask whether the "border color" is light or dark. Question 3 may ask whether the border color of the road sign inside the bounding box is dark or light. Question 4 may ask whether the shape of the road sign inside the bounding box is either "Round," "Diamond," "Rectangle," "TriangleDown," or "TriangleUp." Last, for Question 5, the interface may ask whether the content of the road sign inside the selected bounding box is either a car, arrow, bicycle, pedestrian, or other item. The interface may also ask to select the icon which resembles the icon to the closest inside the bounding box upon all questions being filled. The interface may receive input at each of the questionnaires and utilize each of the input in a machine learning model to further help identify future training and classification of the machine learning system.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system comprising:
    an input interface configured to receive one or more images;
    a controller in communication with the input interface and configured to:
    detect and select a road sign identified across a plurality of frames from the one or more images;
    output a prompt initiating a request for a classification of the road sign;
    detect and classify one or more images including the road signs utilizing a machine learning model;
    query a knowledge graph to obtain a plurality of road sign classes with a same attribute as candidate classes for a next classifier;
    classify the road sign across the plurality of frames; and
    track the road sign across the plurality of frames.

2. The system of claim 1, wherein the controller is further configured to identify one or more attributes associated with the road sign and output a plurality of road sign templates in response to the one or more attributes.

3. The system of claim 1, wherein the controller is further configured to classify the road sign in response to input received at an interface.

4. The system of claim 1, wherein the controller is further configured to output a first classification and, in response to a wrong classification of the first classification, receive input to re-classification from an annotator.

5. The system of claim 1, wherein the controller is further configured to classify the road sign across the plurality of frames in response to a confidence level exceeding a threshold and output a request for attribute input when the confidence level is below the threshold.

6. The system of claim 1, wherein the controller is further configured to output a classification associated with the road sign at a user interface.

7. A method of road sign classification utilizing a knowledge graph, comprising:
    detecting and selecting a representation of a sign across a plurality of frames;
    outputting a prompt initiating a request for a classification associated with the representation of the sign;
    classifying one or more images including the sign;
    querying the knowledge graph to obtain a plurality of road sign classes with at least one same attribute as the sign; and
    classifying the sign across the plurality of frames in response to a confidence level exceeding a threshold.

8. The method of claim 7, wherein the classification assigns an identification associated with the one or more images including signs.

9. The method of claim 7, wherein the classification utilizes one or more machine learning models for detection of road signs, classification of road signs, and prediction of road sign properties.

10. The method of claim 7, wherein the method includes utilizing metric learning to separate different classes in an embedded space.

11. The method of claim 7, wherein the method includes outputting a request for attribute input associated with the representation of the sign when the confidence level is below the threshold.

12. The method of claim 11, wherein the method includes outputting a plurality of potential sign templates in response to the attribute input.

13. A system for road sign classification utilizing a machine learning model, comprising:
    a display configured to output a user interface; and
    a processor in communication with the display, the processor programmed to:
    detect and select a representation of a sign across one or more images utilizing the machine learning model;
    output a prompt at the user interface initiating a request for a classification associated with the representation of the sign;
    classify one or more images including the sign;
    obtain a plurality of road sign classes associated with candidates including at least one same attribute as the sign; and
    classify the sign across the one or more images in response to a confidence level exceeding a threshold.

14. The system of claim 13, wherein the processor is further programmed to output a request for attribute input associated with the representation of the sign when the confidence level is below the threshold.

15. The system of claim 14, wherein the processor is further programmed to output a plurality of sign templates in response to the attribute input.

16. The system of claim 13, wherein the processor is further programmed to output one or more attributes associated with the sign.

17. The system of claim 13, wherein the processor is further programmed to receive as input a geometric shape associated with the sign.

18. The system of claim 13, wherein the processor is further programmed to classify utilizing a one shot classifier or a few shot classifier.

19. The system of claim 13, wherein the processor is further programmed to obtain a plurality of road sign classes with at least one same attribute as the sign.

20. The system of claim 13, wherein the processor is further programmed to classify utilizing a few shot classifier.

* * * * *